Sept. 26, 1961 F. E. ARMSTRONG 3,002,091
METHOD OF TRACING THE FLOW OF LIQUIDS BY USE
OF POST RADIOACTIVATION OF TRACER SUBSTANCES
Filed Nov. 3, 1958
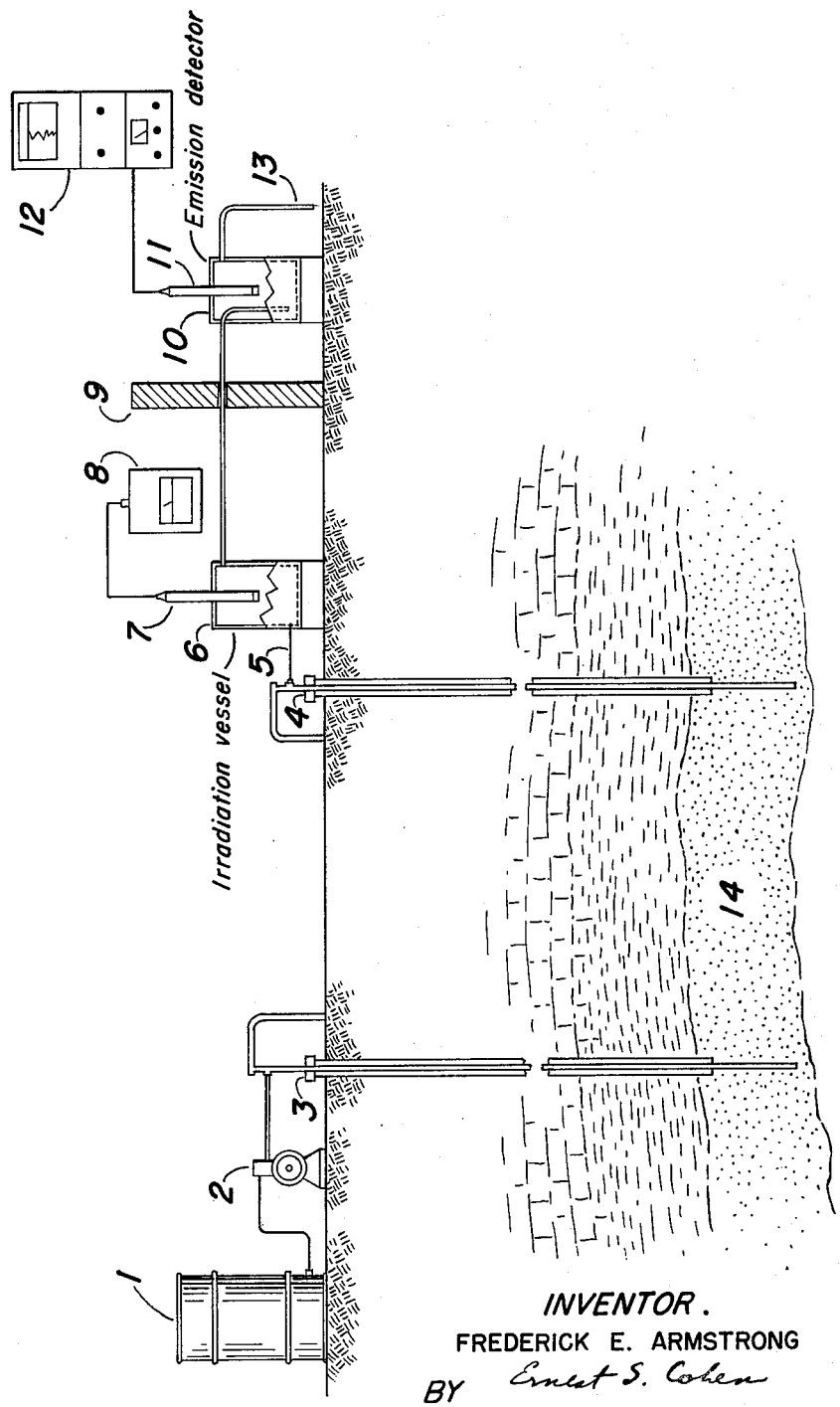
INVENTOR.
FREDERICK E. ARMSTRONG
BY Ernest S. Cohen
ATTORNEY

United States Patent Office 3,002,091
Patented Sept. 26, 1961

---

3,002,091
METHOD OF TRACING THE FLOW OF LIQUIDS BY USE OF POST RADIOACTIVATION OF TRACER SUBSTANCES
Frederick E. Armstrong, Bartlesville, Okla., assignor to the United States of America as represented by the Secretary of the Interior
Filed Nov. 3, 1958, Ser. No. 771,683
8 Claims. (Cl. 250—83)
(Granted under Title 35, U.S. Code (1952), sec. 266)

The invention herein described and claimed may be manufactured or used by or for the United States of America for governmental purposes without payment of royalty thereon or therefor.

This invention relates to a method for determining the flow of fluids through porous media, e.g., earth layers, and tracing their paths therethrough by injecting into a borehole a fluid containing an element, which on neutron irradiation forms a radioisotope, removing the fluid from another borehole spaced from the first, irradiating the effluent fluid with a neutron source, and detecting the radioactivity produced in the added element.

In the production of oil and gas, knowledge of the rate of flow of fluids within and through the subsurface media, particularly during stimulative injection of water or gases into a petroleum reservoir, is of great importance. Choice of the method of secondary recovery is greatly facilitated by knowledge of the direction, rate, or extent of flow of injected fluid into an earth formation. The problem is to determine whether the injected fluid is taking the desired path through the oil sands, thereby displacing oil from the sand and forcing it to move toward a producing well or wells, whether the injected fluid is bypassing the oil sands through fractures or other nonhomogeneous conditions, or whether it is flowing by other paths away from producing wells.

Various methods have been proposed for obtaining this information. One scheme proposes adding a boron compound to injection water and detecting the boron spectrographically at the producer well. Another method proposes the addition of acetylene to the injection fluid and detecting it at the producing well by sensitive chemical tests. In still another method, it is proposed to admix a radioactive element with the injection fluid and then sensing its presence in the effluent at the producing well by a detector for radioactive materials, e.g., a Geiger-Müller or a scintillation counter.

Methods relying on spectrographic or chemical analysis require relatively large amounts of tracer material, while the former method is further handicapped in requiring an emission spectrograph, an instrument which is not readily adaptable for use in the field. Radioisotopes are generally comparatively expensive, and considerable health hazard attends their use. Most important, suitable radioactive isotopes which have a half-life sufficiently long to enable them to be used in tracer tests that may extend over several months are not common. Many dyes have also been tried, but have been found to be strongly absorbed by the reservoir material and hence unsuitable.

It is an object of this invention to provide a method for tracing the flow of fluids through porous media by the addition of a material to the fluid, which is not easily absorbed by the media and which may be made radioactive at the point of detection.

It is a further object to provide a method for tracing the flow of fluids through porous media by injecting a measured quantity of a harmless element into the fluid, irradiating the fluid at a point of detection with a neutron source to form a radioisotope, and detecting and quantitatively measuring the radioactive material.

Other advantages will appear in the following description of my invention and the appended claims.

A preferred mode which has been contemplated for applying the principles of the invention, is illustrated by the figure of the drawing showing a flow diagram comprising structures and devices through the use of which the method of the invention may be accomplished.

With reference to the figure of the drawing, this invention considered broadly, is shown to relate to an improved method for studying the fluid conductance of subsurface strata 14 by impressing a fluid containing a harmless amount of element capable of yielding radioactive material when irradiated with neutrons. This fluid is supplied from a container 1, and is impressed into a test borehole of an injection well 3 intersecting the strata and recovered at a recovery borehole or well. The effluent fluid is irradiated with neutrons from a suitable source 7 and the resultant radioactivity is quantitatively detected by well known detection means 11. Since the material is not activated until it is near the point of detection, elements which yield short half-life radioisotopes can advantageously be employed. This is important from a health standpoint, in view of the problems of storage, and waste disposal. The flow of potable waters can be traced by these means, since very small quantities of non-toxic compounds can be employed as the tracing means. With initially radioactive tracers this is not desirable due to danger of radioactive pollution.

Radioisotopes that have been employed for tagging or tracing fluid flow are usually produced by irradiation by neutron fluxes of high densities in a nuclear reactor. Most elements require irradiation at flux densities of $10^8$ or $10^9$ neutrons per $cm.^2$ per second for some time to produce enough radioactivity to permit the use of the irradiated product as a tracer. There are about 24 elements known at present, which yield detectable radioactivities with irradiation times as short as a few minutes at flux levels of about $10^7$ neutrons per $cm.^2$ per second. Nine of these; dysprosium, europium, vanadium, rhenium, silver, indium, scandium, iodine, iridium, give exceptionally high yields of radioactivity. In most instances the half lives of the produced isotopes are very short, some in the order of minutes.

In one embodiment of my invention, the pattern and rate of flow between injection wells such as shown by element 3 of the drawing, and producing wells such as shown by element 4, of a petroleum water-flood system is determined by first adding a quantity of the element which is to be used as the tracer of the input fluid, usually water or brine in water flooding. The element employed is in the form of a water soluble salt, and is one which does not occur normally in the underground brine or water in the oil field. Dysprosium, iridium, europium, and scandium, and iodine are satisfactory, but of course the other elements may be employed where desired. The amount to be added depends on the degree of dilution expected before the tracer reaches the detection point. Concentrations as low as 0.1 part per million would be readily detectable. If information is required concerning the exact degree of dilution, then the quantity of tracer added must be known exactly.

Water containing the tracer element in solution is removed at the producer well 4, by a sampling line 5, and passed into a vessel 6 wherein it is irradiated for a suitable period of time with neutrons at a flux density of preferably $10^7$ neutrons per $cm.^2$ per second, or higher. One suitable source of this flux density is a large size radium-beryllium neutron source 7, comprising an accelerator beam tube and target assembly such as commonly used for neutron-logging oil wells. Also, a small accelerator of the Van de Graaff type, recently introduced as a neutron source in the well-logging art, may be employed. The latter has the advantage, in addition to producing a higher flux density than the usual radium-beryllium source, that it is not a potential radiation hazard when not in operation.

The flow rate of liquid into and out of the irradiation vessel 6 is controlled so as to maintain a constant rate of irradiation of the sample. This is important since the amount of radioactivity is a function both of the amount of sample present and the irradiation time, the flow rate being held constant.

The liquid leaving the irradiation unit is radioactive to an extent dependent on the flux density of the neutrons, the amount of other elements with high neutron-captive cross section present, the time of irradiation and the amount of tracer present. After irradiation the tracer element may be measured in several ways. If no, or few other substances with neutron-capture cross sections comparable to that of the tracer are present, the induced radioactivity may be determined with a Geiger-Müller counter, preferably of the rate-meter type with provision for recording the intensity of radioactivity. If the amount of tracer that may be expected to be produced is small, it may be desirable to employ a scintillation counter 11, which is more sensitive. Should a considerable amount of the radiation present be caused by elements of high neutron-capture cross section normally present in the fluid, counting should be done with instruments that can be made to respond to but one energy level of radiation. The scintillation counter may be adapted to be employed in this manner, as is known to those skilled in the art. This counting or measuring procedure permits measuring the radiation emitted by the tracer even in the presence of considerable radiation from other sources. However, if there are present large quantities of substances interfering with the counting technique, a simple separation may be made, either to separate the tracer from the liquid, or remove the interfering substances from the liquid.

A gaseous tracer may be employed where the driving fluid is a gas. Also finely divided solid tracer material which can be dispersed in the gas or liquid medium may be employed. As used in this application and claims, the individual elements named are also intended to include their chemical compounds, since so far as regards neutron irradiation, they are equivalent.

*Example*

A tracer test is made in a typical waterflood reservoir having a strata 14 of a sandstone formation 20 feet thick at 600 feet, a permeability of 50 millidarcys, a porosity of 20% and a water saturation of 80%. Water injected at the rate of 200 barrels per day into the center well such as the injection well 3, of an inverted five-spot drilling pattern should appear at the producing wells such as the well 4, in 120 days if no channelling or highly permeable streaks between input and producing wells exist. This is calculated by a graphical method from the equation $$\Delta t = \frac{u\phi}{k} \frac{(\Delta L)^2}{\Delta P}(0.158)$$

assuming ideal conditions, and the equipressure contours and stream travel lines for two wells of a homogeneous 5-spot pattern as described by Wycoff, Bolset and Muscat in volume 103, Transact AIME (1933). In the equation:

$\Delta t$ = time for injected front advance between equipressure contour lines along a stream travel line, days.

$\Delta L$ = distance between equipressure contour lines along a stream travel line, feet.

$\Delta P$ = pressure difference between equipressure contour lines, p.s.i.

$u$ = viscosity of injected and system fluids, centipoises.

$k$ = permeability of the medium, darcys.

$\phi$ = fraction of pore space occupied by moving front, porosity times saturation, fraction.

0.158 = unit conversion constant.

From calculations based on the above equation and familiar to those skilled in the art, it can be shown that tracer injected for a period of 20 hours at the injection well 3, into a total of approximately 170 barrels of injected water, should produce a minimum dilution of approximately 10 times at the surrounding producing wells. Accordingly, an amount of tracer is added from the supply 1 of tracer material in solution, by means of proportioning injection pump 2, to the injected water which may be expected to produce a concentration in the produced water sufficiently high to allow it to be detected by the method described. In most instances the required concentration at the producing well will be less than .1 part per million by weight. In the present example, 5 kilograms of potassium iodide is proportioned by the pump 2 into the injection water over a period of 20 hours, producing a concentration at the producing wells somewhat greater than 10 parts per million under ideal conditions. If the condition of the formation between injection and producing wells is other than homogeneous, the tracer material will arrive sooner and with less dilution, the amount of dilution becoming less with further decreases in homogeneity. Comparison of such data with the calculated data can thus indicate the amount of non-homogeneity which exists in the formation.

At the production well, a simple oil-water separator removes a portion of the produced water and permits it to flow through line 5 and the chamber of the activation unit comprising elements 6 and 7, connected to a high-voltage supply and controls 8. This preferably is a small accelerator of the D-T type operating at an accelerating potential of 100 kilovolts employing the reaction $D+T \rightarrow He^4+n+17.7$ mev., such as is described in Nucleonics, vol. 15, No. 9, pp. 192-194. Such a device has an accelerating tube such as element 7, about 12 inches long, is $1\frac{5}{16}$ inches in diameter, and produces a flux of about $10^8$ neutrons per second. The produced water flows into and through the chamber 6 surrounding the target of the accelerator tube 7, thus acting as a moderator and at the same time exposing the trace material to the neutron flux for activation. A flow rate of about 10 milliliters per minute should allow an average exposure time of approximately ½ hour with a 3 liter chamber. After activation the water flows through a shield 9 to the detector unit which consists of a Geiger-Müller thin-wall tube such as element 11 and a recording counting-rate meter 12. The sample flows through a container 10 surrounding the Geiger-Müller tube with a volume essentially the same as that of the irradiation chamber and out through an effluent drain 13, thus making maximum use of the sample volume and at the same time acting as a secondary shield for the detector. The radioisotope produced from the tracer by irradiation will be iodine 128 which has a half life of 25 minutes and emits a 2 mev. beta ray. The choice of the detecting element is dictated by the radiation produced by the activated tracer element, i.e., if the radiation is primarily beta, the choice should be a Geiger tube, if gamma, a scintillation detector 11 will have increased sensitivity and discrimination for this emission.

Obviously, other water soluble iodine compounds, such as inorganic salts, acids, or soluble organic compounds may be employed. However, the most easily obtainable and economically the most feasible will ordinarily prove to be the iodide salts, such as the potassium iodide of the example.

Other modes of applying the principle of this invention may be employed, it not being limited to the specific embodiment disclosed and the scope of said invention is to be determined solely by the following claims:

I claim:

1. A process for tracing the flow of fluids underground which comprises enriching the fluid at one underground point with a tracer element capable of yielding a radioactive isotope when irradiated with neutrons having a flux density of at least $10^7$ neutrons per cm.$^2$ per second, withdrawing a sample of the fluid at a second underground point, irradiating said sample with neutrons having a flux density of at least $10^7$ neutrons per cm.$^2$ per second for a period of time sufficient to produce radioactive isotopes from said tracer element, and measuring the resulting radiation.

2. In a process of water-flooding an oil field and tracing the flow of water used in said flooding, wherein water is injected into a producing zone in said field through an input well to force liquid out of at least one production well, the steps of adding a tracer element to the injected water, said tracer element being selected from the group consisting of dysprosium, europium, silver, rhenium, vanadium, iodine, and iridium, taking samples from one production well, irradiating said sample with neutrons having a flux density of at least $10^7$ neutrons per cm.$^2$ per second for a period of time sufficient to produce radioactive isotopes from said tracer element and measuring the resultant radioactivity.

3. A method for studying the characteristics of the subsurface strata which comprises, injecting at one underground point a gas containing a tracer element, said tracer element being selected from the class consisting of dysprosium, europium, silver, rhenium, vanadium, indium, iodine, and iridium, removing a gas sample from a point underground, spaced from the first injection point, irradiating said sample with neutrons having a flux density of at least $10^7$ neutrons per cm.$^2$ per second, for a period of time sufficient to produce radioactive isotopes from said tracer element, and measuring the resultant radioactivity.

4. A process for tracing the flow of fluids underground which comprises the steps of enriching the fluid at one underground point with iodine as a tracer element, withdrawing a sample of fluid at a second underground point, irradiating said sample with neutrons having a flux density of at least $10^7$ neutrons per cm.$^2$ per second for a period of time sufficient to produce radioactive iodine 128, and measuring the resulting radiation.

5. A process for tracing the flow of liquids underground, which comprises the steps of adding to the liquid at a first underground position a solution containing potassium iodide as a tracer, withdrawing a sample of liquid at a second underground position, irradiating said sample with neutrons having a flux density of at least $10^7$ neutrons per cm.$^2$ per second for a period of time sufficient to produce radioactive iodine 128, and measuring the resulting radiation.

6. The method of claim 2, wherein the tracer added is iodine.

7. The method of claim 2, wherein the tracer added is potassium iodide.

8. The method of claim 3, wherein the tracer added is iodine.

References Cited in the file of this patent

UNITED STATES PATENTS

| | | |
|---|---|---|
| 2,394,703 | Lipson | Feb. 12, 1946 |
| 2,429,577 | French | Oct. 21, 1947 |
| 2,443,680 | Herzog | June 22, 1948 |
| 2,560,510 | Hinson | July 10, 1951 |
| 2,640,936 | Pajes | June 2, 1953 |
| 2,841,713 | Howard | July 1, 1958 |
| 2,910,587 | Sayre | Oct. 27, 1959 |

OTHER REFERENCES

Second United Nations International Conference on Peaceful Uses of Atomic Energy, vol. 19, United Nations Press, September 1 to 13, 1958, pages 112 to 119.